3,376,328
TRIORGANO (HYDROXYALKYLENOXY) TIN COMPOUNDS, THEIR TRIHYDROCARBYL-TIN (IV) ALCOHOLATE AND HYDROCARBYLETHER DERIVATIVES AND THE PREPARATION THEREOF

Alwyn George Davies, London, England, assignor to M & T Chemicals Inc., New York, N.Y., a corporation of Delaware
No Drawing. Filed Oct. 26, 1964, Ser. No. 406,563
19 Claims. (Cl. 260—429.7)

ABSTRACT OF THE DISCLOSURE

In accordance with certain of its aspects, this invention relates to novel compositions and to the process for preparing a compound of the formula $$R_3Sn(-O-CR''_2-)_nOR'$$

wherein R is selected from the group consisting of alkyl, aryl, and alkenyl; R'' is selected from the group consisting of alkyl, aryl, alkenyl, hydrogen; R' is selected from the group consisting of alkyl, aryl, alkenyl, hydrogen and —SnR$_3$; and $n$ is an integer; which process comprises reacting together R$_3$SnOR' and R''$_2$C=O in the molar ratio of one mole of R$_3$SnOR' to $n$ moles of R''$_2$C=O.

---

This invention relates to a novel process for preparing organotin compounds and to novel compounds produced thereby. It also relates to a novel process for preparing organic polymers of the polyacetal type.

Polyacetals and related polymers have found considerable commercial acceptance in various areas including the fabrication of structural and ornamental articles. However, known processes for preparing such polymers have proved to be too expensive or unwieldy for optimum commercial exploitation.

It is an object of this invention to provide a novel process for preparing polymers of the polyacetal type. It is a further object to provide novel organotin compounds and methods for preparing the same. Other objects will become apparent to those skilled in the art upon reading the following disclosure.

In accordance with certain of its aspects, this invention relates to the process for preparing a compound of the formula R$_3$Sn(—O—CR''$_2$—)$_n$OR' wherein R is selected from the group consisting of alkyl, aryl, and alkenyl; R'' is selected from the group consisting of alkyl, aryl, alkenyl, hydrogen. R' is selected from the group consisting of alkyl, aryl, alkenyl, hydrogen and —SnR$_3$; and $n$ is an integer; which process comprises reacting together R$_3$SnOR' and R''$_2$C=O in the molar ratio of one mole of R$_3$SnOR' to $n$ moles of R''$_2$C=O.

The process of this invention provides a method for making novel compounds of the formula $$R_3Sn(-O-CR''_2-)_nOR'$$

wherein R, R', and R'' have the meanings hereinbefore set forth, from a compound R''$_2$C=O wherein R'' is selected from the group consisting of alkyl, aryl, alkenyl, and hydrogen and wherein both R'' groups need not be the same. The compound R''$_2$C=O may typically be an aldehyde or a ketone.

R'' may be selected from the group consisting of alkyl, aryl, alkenyl, and hydrogen. For example, R'' may be alkyl including methyl, ethyl, n-propyl, isopropyl, n-butyl, isobutyl, sec-butyl, tert-butyl, n-amyl, neopentyl, isoamyl, n-hexyl, isohexyl, heptyl, octyl, decyl, dodecyl, tetradecyl, octadecyl, cyclopentyl, cyclohexyl, cycloheptyl, cyclooctyl, etc. R'' may be aryl, including phenyl, naphthyl, anthryl, phenanthryl, etc. R'' may be alkenyl, including allyl, 1-propenyl, methallyl, buten-2-yl, buten-3-yl, penten-1-yl, hexenyl, heptenyl, octenyl, decenyl, dodecenyl, tetradecenyl, octadecenyl, etc. R'' may also be an inertly substituted radical of the type hereinbefore described. Typical inert substituents which may be present include alkyl, aryl, cycloalkyl, aralkyl, alkenyl, ether, halogen, etc. Typical substituted alkyls include trichloromethyl, 3-chloropropyl, 2-ethoxyethyl, benzyl, 4-methylcyclohexyl, 4-chlorocyclohexyl, β-phenylethyl, etc. Typical inertly substituted aryl include chlorophenyl, biphenyl, anisyl, tolyl, xylyl, p-nonylphenyl, p-styryl, etc. Typical substituted alkenyls include 4-chloro-2-butenyl, chloroallyl, 4-phenyl-3-butenyl, etc.

R''$_2$C=O may be an aldehyde, including formaldehyde, acetaldehyde, chloral, propionaldehyde, benzaldehyde, cyclohexylaldehyde, p-toluolaldehyde, α-toluolaldehyde, allylaldehyde, etc. Preferably, when R''C=O is an aldehyde, it may be chloral.

R''$_2$C=O may be a ketone, including dimethylketone, methyl ethyl ketone, phenyl methyl ketone, benzophenone, acetophenone, benzyl methyl ketone, dibenzyl ketone, di-n-butyl ketone, etc.

In accordance with this invention, R''$_2$C=O may be reacted with a compound R$_3$SnOR' wherein R' is selected from the group consisting of alkyl, aryl, alkenyl, hydrogen, and R$_3$Sn—; and R is selected from the group consisting of alkyl, aryl and alkenyl.

For example, R may be alkyl including methyl, ethyl, n-propyl, isopropyl, n-butyl, isobutyl, sec-butyl, tert-butyl, n-amyl, neopentyl, isoamyl, n-hexyl, isohexyl, heptyl, octyl, decyl, dodecyl, tetradecyl, octadecyl, cyclopentyl, cyclohexyl, cycloheptyl, cyclooctyl, etc. R may be aryl, including phenyl, naphthyl, anthryl, phenanthryl, etc. R may be alkenyl, including allyl, 1-propenyl, methallyl, buten-2-yl, buten-3-yl, penten-1-yl, hexenyl, heptenyl, octenyl, decenyl, dodecenyl, tetradecenyl, octadecenyl, etc. R may also be an inertly substituted radical of the type hereinbefore described. Typical inert substituents which may be present include alkyl, cycloalkyl, arylalkyl, alkaryl, alkenyl, ether, halogen, etc. Typical substituted alkyls include trichloromethyl, 3-chloropropyl, 2-ethoxyethyl, benzyl, 4-methylcyclohexyl, 4-chlorocyclohexyl, β-phenylethyl, etc. Typical inertly substituted aryl include chlorophenyl, biphenyl, anisyl, tolyl, xylyl, p-nonylphenyl, p-styryl, etc. Typical substituted alkenyls include 4-chloro-2-butenyl, chloroallyl, 4-phenyl-3-butenyl. All of the R groups need not be the same. Preferably, R may be phenyl or lower alkyl, i.e. alkyl containing less than about 10 carbon atoms.

R' may be hydrogen or any of the alkyl, aryl or alkenyl radicals described for R. R' may also be R$_3$Sn wherein R has the meaning hereinbefore given, and R$_3$SnOR' may be (R$_3$Sn)$_2$O.

R$_3$SnOR' may be a triorganotin alkoxide or aryloxide, such as trimethyltin methoxide, triethyltin ethoxide, tri-n-propyltin ethoxide, triisopropyltin methoxide, tri-n-butyltin methoxide, tri-n-butyltin ethoxide, tri-n-propyltin phenoxide, tri-n-butyltin phenoxide, triphenyltin 2-ethylhexoxide, triethyltin phenoxide, tritolyltin isopropoxide, tribenzyltin methoxide, tri-n-butyltin benzoxide, etc.

R$_3$SnOR' may be a triorganotin hydroxide or bis(triorganotin)oxide. As is well known to those skilled in the art, the triorganotin hydroxides and bis(triorganotin) oxides may coexist in equilibrium, or conditions may favor one form over the other. In this invention, either form may be used, including trimethyltin hydroxide, triethyltin hydroxide, bis(triethyltin)oxide, tri-n-propyltin hydroxide, bis(triisopropyltin)oxide, bis(tri-n-butyltin) oxide, triphenyltin hydroxide, bis(triphenyltin)oxide, tricyclohexyltin hydroxide, bis(tricyclohexyltin)oxide, etc.

The reaction of $R''_2C=O$ with $R_3SnOR'$ may be effected by mixing the two reactants to form an intimate mixture and maintaining the so-formed mixture, preferably with agitation, at a moderate reaction temperature, typically 0–100° C., and preferably 0–50° C., say 25 C. until the desired reaction is achieved, typically for about 1 minute to 24 hours.

The reaction of one mole of $R''_2C=O$ with one mole of $R_3SnOR'$ proceeds according to Reaction I.

(I)
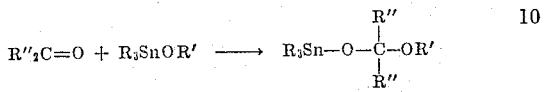

$$R''_2C=O + R_3SnOR' \longrightarrow R_3Sn-O-\underset{R''}{\overset{R''}{C}}-OR'$$

In the specific embodiment wherein the reactants are chloral and tri-n-butyltin methoxide, the reaction may be expressed by Equation II.

(II)
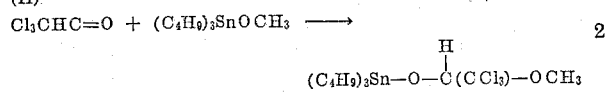

$$Cl_3CHC=O + (C_4H_9)_3SnOCH_3 \longrightarrow$$
$$(C_4H_9)_3Sn-O-\underset{H}{C}(CCl_3)-OCH_3$$

When $R_3SnOR'$ is bis(tri-n-butyltin)oxide, the reaction may be expressed by Equation III.

(III)
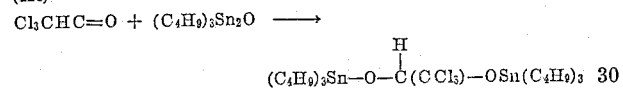

$$Cl_3CHC=O + (C_4H_9)_3Sn_2O \longrightarrow$$
$$(C_4H_9)_3Sn-O-\underset{H}{C}(CCl_3)-OSn(C_4H_9)_3$$

It will be noted that the novel products obtained correspond to the general formula

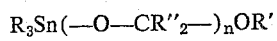

$$R_3Sn(-O-CR''_2-)_nOR'$$

wherein $n$ is 1. These novel compounds may be recovered from the reaction mixture by distillation, solvent extraction, or other suitable technique. They may be used as biologically active materials, such as fungicides, bactericides, insecticides, etc. They are especially useful in the practice of this invention for preparing novel compounds wherein $n$ has a value greater than 1.

It is a particular feature of this invention that the products of reaction Equations I, II and III are capable of reacting further with additional quantities of $R''_2C=O$ as shown in Equation IV.

(IV)
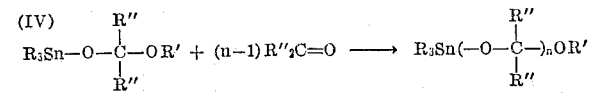

$$R_3Sn-O-\underset{R''}{\overset{R''}{C}}-OR' + (n-1)R''_2C=O \longrightarrow R_3Sn(-O-\underset{R''}{\overset{R''}{C}}-)_nOR'$$

Or, as in the specific embodiment of Equation II.

(V)
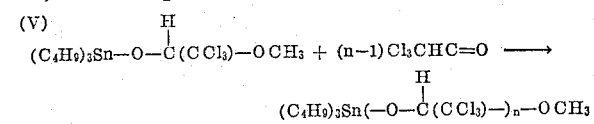

$$(C_4H_9)_3Sn-O-\underset{H}{C}(CCl_3)-OCH_3 + (n-1)Cl_3CHC=O \longrightarrow$$
$$(C_4H_9)_3Sn(-O-\underset{H}{C}(CCl_3)-)_n-OCH_3$$

In accordance with the process of this invention as represented by the combination of general Reactions I and IV, it is possible to produce a polymer

$$R_3Sn(-OCR''_2)_nOR'$$

from one mole of $R_3SnOR'$ and $n$ moles of $R''_2C=O$. It will, of course, be understood that $n$ will be an integer for any polymer molecule, but that any given preparation will yield a mixture of polymers wherein the average value for $n$ in the mixture need not be an integer.

It is a further particular advantage of the process of this invention that the polymers formed are "living" polymers, i.e. they retain their ability to further polymerize so long as the group $R_3Sn-$ remains affixed to the growing molecule. Thus, it is readily possible to form block copolymers, for example, by reacting $R_3SnOR'$ with a first compound $R''_2C=O$ until the latter is exhausted and then adding a different $R''_2C=O$ which will add to the living end of the polymer. Thus, any number of different $R''_2C=O$ compounds may be incorporated in blocks into the polymer chain. It is also possible to copolymerize simultaneously two or more $R''_2C=O$ compounds simply by using a mixture of the desired compounds in the reactions. In theory, there is no limit to the value of $n$. In practice it may be found that products wherein $n$ has a value of about 1–50 may be readily obtained.

Practice of this novel invention permits preparation of a large number of novel products of the formula $R_3Sn(-O-CR_2''-)_nOR'$ including the following illustrative materials: α-triethyltin-ω-methoxy(trichloromethyl acetal); α-triethyltin-ω-isopropoxy poly(methyl ethyl acetal); α-triethyltin-ω-methoxy polyacetal; α-tri-n-propyltin-ω-phenoxy(isobutyl acetal); α-tri-n-propyltin-ω-tri-n-propylstannoxy (dimethylacetal); α-triisopropyltin-ω-n-propoxy(methyl ethyl acetal); α-triisopropyltin-ω-methoxy poly(phenyl acetal); α-tri-n-butyltin-ω-tri-n-butylstannoxy(trichloromethyl acetal); α-tri-n-butyltin-ω-ethoxy poly(trichloromethyl acetal); α-tri-n-butyltin-ω-tri-n-butylstannoxy poly(trichloromethyl acetal); α-tri-n-butyltin-ω-benzoxy polyacetal; α-triphenyltin-ω-methoxy poly(methyl acetal); α-triphenyltin-ω-triphenylstannoxy acetal; α-tricyclohexyltin-ω-methoxy(trichloromethyl acetal); α-tricyclohexyltin-ω-ethoxy(isobutyl acetal); α-tribenzyltin-ω-methoxy poly(ethyl acetal); α-triallyltin-ω-methoxy poly(isobutyl acetal); etc.

In the preferred embodiment of the process of this invention, the compound $R_3SnOR'$ may be placed in a reaction vessel and the compound $R''_2C=O$ may be added thereto incrementally with stirring over a period of time, say 1–60 minutes. Typically, the reaction may be exothermic, and cooling means may be provided to maintain the desired reaction temperature. Inert solvents may be employed, if desired, to facilitate control of the reaction, and to provide improved fluidity and heat transfer. Typical inert solvents include organic ethers such as ethyl ether, butyl ether, tetrahydrofuran, 2-methyltetrahydrofuran, tetrahydrofurfuryl ethyl ether, etc., and hydrocarbon solvents such as benzene, toluene, xylene, pentane, hexane, heptane, ligroin, petroleum ether, etc. When an inert solvent is employed, it may typically be present in the amount of about 50–1,000 ml., preferably 75–200 ml., per mole of $R''_2C=O$. Mixtures of solvent may be employed if desired.

The relative amounts of $R_3SnOR'$ and $R''_2C=O$ employed will depend upon the product desired. Typically, at least one mole of $R''_2C=O$ will be used per mole of $R_3SnOR'$. When products having an $n$ value greater than 1 are desired, correspondingly greater amounts of $R''_2C=O$ will be employed. Typically the amount of $R''_2C=O$ employed may be preferably 1 mole per mole of $R_3SnOR'$. The process of this invention typically gives very high yields, approaching the theoretical yield, and conversion of $R''_2C=O$ to product may, in preferred embodiments, be essentially quantitative.

When the product $R_3Sn(-OCR''_2-)_nOR'$ of desired composition has been obtained, the product may be converted to one which is more stable to hydrolysis by replacing $R_3Sn-$ with a group which has enhanced resistance to hydrolysis. This is especially desirable when the product is a polymer of the polyacetal type wherein a hydrolysis-resistant end-group or "cap" is desirable to prevent depolymerization of the polymer chain. A preferred technique for capping the polymer comprises reacting the organotin-containing product with an organic carboxylic compound selected from the group consisting of carboxylic acid anhydrides and carboxylic acid halides. These reactions may be illustrated as (VI) $R_3Sn(-O-CR''_2-)_nOR' + (R^*CO)_2O \rightarrow$
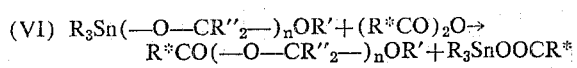
$R^*CO(-O-CR''_2-)_nOR' + R_3SnOOCR^*$ wherein R* is selected from the group consisting of alkyl, aryl, alkenyl and hydrogen, including those hereinbefore described. More specifically, the reaction may be (VII)
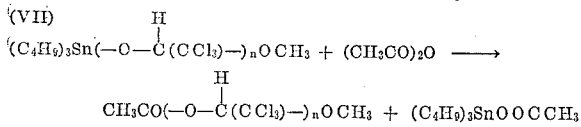

Similarly, the organotin-containing product may be reacted with an organic carboxylic acid halide (VIII) $R_3Sn(-O-CR''_2-)_nXR' + R^*COY \rightarrow$
$R^*CO(-O-CR''_2-)_nXR' + R_3SnY$ wherein Y is halogen, typically chlorine, bromine and iodine, and preferably chlorine. More specifically, the reaction may be (IX)
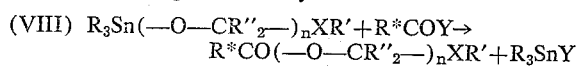

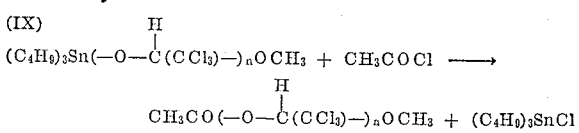

Typical illustrative anhydrides and acid halides which may be employed in the capping reaction include acetic anhydride phthalic anhydride, benzoic anhydride, cyclohexanoic anhydride, acrylic anhydride, propionic anhydride, α-toluic anhydride, p-toluic anhydride, p-vinylbenzoic anhydride, acetyl chloride, acetyl bromide, propionyl chloride, benzoyl bromide, benzoyl chloride, α-toluyl chloride, p-toluyl chloride, acryloyl chloride, etc.

It is a particular feature of this invention that it may provide a convenient technique for preparing crystalline polyacetals having a high order of stereoregularity. Moreover, these crystalline polymers may be produced at temperature close to room temperature, thus eliminating the problems associated with prior art low-temperature techniques.

Practice of illustrative embodiments of this invention may be observed from the following specific examples.

EXAMPLE 1

Reaction of tributyltin methoxide with chloral

Tributyltin methoxide (2.135 g.) was mixed with chloral (0.71 cc., 1.1 mol. equivalents) at room temperature. After the ensuing exothermic reaction had subsided, the excess of chloral was removed by distillation under reduced pressure to leave a residue of the adduct, α-tributyltin-ω-methoxy(trichloromethyl acetal).

Analysis of the adduct gave the following composition:

| | Percent by wt. |
|---|---|
| Carbon | 38.5 |
| Hydrogen | 6.7 |
| Tin | 25.3 |
| Chloral | 22.7 |

The theoretical analysis of the product is as follows:

| | Percent by wt. |
|---|---|
| Carbon | 38.6 |
| Hydrogen | 6.6 |
| Tin | 25.1 |
| Chlorine | 22.8 |

EXAMPLE 2

Reaction of tributyltin methoxide with an excess of chloral

Tributyltin methoxide (0.783 g.) was added to an excess of redistilled chloral (3.8 to 4 g., 10.6 mol equivalents) at room temperature, a slightly exothermic reaction occurred. The mixture was left for forty-eight hours during which time the mixture solidified to a stiff jelly.

The occluded chloral was extracted with pentane leaving the α-tributyltin-ω-methoxy poly(trichloromethyl acetal) in the form of white flakes. The infrared spectrum of the product and its solubility behaviour was the same as would be expected for isotactic polychloral.

EXAMPLE 3

Reaction of bis(tributyltin)oxide with chloral

Redistilled chloral (0.50 cc.) and bis(tributyltin)oxide (3.037 g.) were mixed at room temperature. After the ensuing exothermic reaction had subsided, the excess chloral was removed by subjecting the reaction mixture to a reduced pressure for a period of one hour to isolate the product α-tributyltin - ω - tributylstannoxy(trichloromethyl acetal).

The infrared spectrum of the product showed that none of the initial reactants were present.

Analysis of the product gave the following results:

| | Percent by wt. |
|---|---|
| Tin | 31.1 |
| Chlorine | 13.9 |

The theoretical values for α-tributyltin-ω-tributylstannoxy(trichloromethyl acetal) are:

| | Percent by wt. |
|---|---|
| Tin | 31.9 |
| Chlorine | 14.3 |

EXAMPLE 4

Reaction of bis(tributyltin)oxide with an excess of chloral (a) Bis(tributyltin)oxide (1.0 g.) was added to redistilled chloral (4.1 g., 16 mol. equivalents) at room temperature to result in a slightly exothermic reaction. After a few hours, the reaction mixture had set to a stiff jelly.

The excess chloral was extracted from the product with ether to isolate the α-butyltin-ω-tributylstannoxy poly(trichloromethyl acetal). The infrared spectrum of the product was identical with that expected for isotactic polychloral except for the presence of peaks which can be ascribed to the presence of tributyltin group.

(b) The same procedure was employed for polymerization chloral using different amounts of the bis(tributyltin)oxide. The results are set out in the following table:

| | Reaction Time (hrs.) | Appearance of Polymer |
|---|---|---|
| Molar ratio, chloral/bis (tributyltin)oxide: | | |
| 10 | 3 | Waxy flakes. |
| 50 | 3 | Coarse powder. |

In each case, the resulting polymer was insoluble in all common organic solvents. The infrared spectrum of each polymer was similar to that reported by Novak and Whalley (Trans. Faraday Soc. 1958, 55, 1490), for isotactic polychloral. The product polychloral appeared to be a "living" polymer in the sense that the degree of polymerization could be increased by the addition of further quantities of chloral, or decreased by distilling chloral from the polymer.

EXAMPLE 5

Reaction of tributyltin methoxide or bis(tributyltin) with other aldehydes

The reaction of a number of aldehydes with tributyltin methoxide or bis(tributyltin)oxide was investigated by following the infra red spectra and the proton magnetic resonance spectra of the reaction mixtures. In the infrared spectrum the addition reaction resulted in the disappearance of the strong carbonyl stretching frequency near the 6 micron range and the disappearance of the broad band of the bis(tributyltin)oxide near the 13 micron frequency.

In the proton magnetic resonance spectra, the addition reaction caused the disappearance of the aldehyde proton at a low field (τ approximately 0–1) and its appearance at a higher field (τ about 5).

These experiments were carried out using the aliphatic aldehydes, acetaldehyde, isovaleraldehyde, and butyraldehyde. The reactions in each case were rapid and exothermic the 1:1 adduct being formed substantially quantitatively within a few minutes of initiating the reaction.

The reaction of the same aliphatic aldehydes with bis(tributyltin)oxide resulted in a slower reaction, the 1:1 adduct being formed during a period of 12–24 hours when the reaction was carried out at room temperature.

EXAMPLE 6

Reaction of tributyltin methoxide with more than one aldehyde

Example 5 was repeated in which 1:1 adduct of butyraldehyde with tributylin methoxide was treated with 1 mol. of chloral. The infrared spectra and the proton magnetic resonance spectra of the reaction mixture showed that the principal reaction which occurred was the displacement of the butyraldehyde by the chloral to give two 1:1 adducts in equilibrium. The appearance of new peaks in the $\tau=5$ regions of the proton magnetic resonance spectra and the integration of the spectra of the reaction mixture showed that adducts containing 1 molecule of tributyltin methoxide and 2 molecules of aldehyde were formed.

The novel polyacetal prepared in accordance with the process of this invention may find use as structural materials, in decorative items, etc. The highly crystalline polyacetals are particularly useful because of the high strength, hardness, etc. which they possess.

Although this invention has been illustrated by reference to specific examples, numerous changes and modifications thereof which clearly fall within the scope of the invention will be apparent to those skilled in the art.

What I claim as my invention and desire to secure by Letters Patent is:

1. The process for preparing a compound of the formula $R_3Sn(-O-CR''_2-)_nOR'$ wherein R is selected from the group consisting of alkyl, aryl, and alkenyl; R'' is selected from the group consisting of alkyl, aryl, alkenyl and hydrogen, R' is selected from the group consisting of alkyl, aryl, alkenyl, hydrogen and $-SnR_3$; and $n$ is an integer which process comprises reacting together $R_3SnOR'$ and $R''_2C=O$ in the molar ratio of one mole of $R_3SnOR'$ to $n$ moles of $R''_2C=O$.

2. A process as claimed in claim 1 wherein $n$ is an integer from 1 to 100.

3. A process as claimed in claim 1 wherein $n$ is an integer between 1 and 50.

4. The process claimed in claim 2 wherein R is phenyl.

5. The process claimed in claim 2 wherein R' is lower alkyl.

6. The process claimed in claim 2 wherein $R''_2C=O$ is choral.

7. The process for preparing a compound of the formula $R_3Sn(-O-CR''_2-)_nOR'$ wherein R is lower alkyl; R'' is selected from the group consisting of alkyl, aryl, alkenyl and hydrogen, R' is selected from the group consisting of alkyl, aryl, alkenyl, hydrogen and $-SnR_3$; and $n$ is an integer from about 1 to 100; which comprises reacting together $R_3SnOR'$ and $R''_2C=O$ in the molar ratio of one mole of $R_3SnOR'$ to $n$ moles of $R''_2C=O$.

8. The process claimed in claim 7 wherein R' is lower alkyl.

9. A novel composition of the formula $$R_3Sn(-O-CR''_2)_nOR'$$

wherein R is selected from the group consisting of alkyl, aryl, and alkenyl; R'' is selected from the group consisting of alkyl, aryl, alkenyl, and hydrogen, R' is selected from the group consisting of alkyl, aryl, alkenyl, hydrogen and $-SnR_3$; and $n$ is an integer from about 1 to 100.

10. The novel composition of claim 9 wherein R is lower alkyl.

11. The novel composition of claim 9 wherein R' is lower alkyl.

12. The novel composition of claim 9 wherein R' is phenyl.

13. A novel composition of the formula $$R_3Sn(-O-\overset{H}{\underset{|}{C}}(CCl_3)-)_nOR'$$

wherein R is selected from the group consisting of alkyl, aryl, and alkenyl; R' is selected from the group consisting of alkyl, aryl, alkenyl, hydrogen and $-SnR_3$; and $n$ is an integer from about 1 to 100.

14. The composition claimed in claim 13 wherein R is lower alkyl.

15. The composition claimed in claim 13 wherein R' is lower alkyl.

16. The process for preparing a composition of the formula $R^*CO(-O-CR''_2-)_nOR'$ wherein $R^*$ is selected from the group consisting of alkyl, aryl, alkenyl and hydrogen; R' is selected from the group consisting of alkyl, aryl, alkenyl, hydrogen and $-SnR_3$; R'' is selected from the group consisting of alkyl, aryl alkenyl and hydrogen, and $n$ is an integer from about 1 to 100; which comprises reacting together $R''_2C=O$ with $$R_3SnOR'$$

wherein R is selected from the group consisting of alkyl, aryl and alkenyl, in the molar ratio of one mole of $R_3SnOR'$ to $n$ moles of $R''_2C=O$ thereby forming as product $R_3Sn(-O-CR''_2-)_nOR'$; and reacting said product with a compound selected from the group consisting of $(R^*CO)_2O$ and $R^*COY$ wherein Y is halogen thereby forming $R^*CO(-O-CR''_2-)_nOR'$.

17. The process of claim 16 wherein R is lower alkyl.

18. The process of claim 16 wherein R' is lower alkyl.

19. The process of claim 16 wherein $n$ is an integer from about 1 to 50.

References Cited

UNITED STATES PATENTS 2,591,675   4/1952   Church et al. _____ 260—429.7 X
2,593,267   4/1952   Church et al. _____ 260—429.7 X TOBIAS E. LEVOW, *Primary Examiner.*

W. F. W. BELLAMY, *Assistant Examiner.*